United States Patent
Yu et al.

(10) Patent No.: US 10,638,127 B2
(45) Date of Patent: Apr. 28, 2020

(54) ADAPTIVE ANCHOR FRAME AND QUANTIZATION PARAMETER DECISION IN VIDEO CODING

(71) Applicant: QUALCOMM Incorporated, San Diego, CA (US)

(72) Inventors: Yang Yu, San Diego, CA (US); In Suk Chong, San Diego, CA (US); Xianglin Wang, San Diego, CA (US); Prasanjit Panda, San Diego, CA (US); Mayank Tiwari, San Diego, CA (US); Marta Karczewicz, San Diego, CA (US); Shashidhar Jangili, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 15/977,590

(22) Filed: May 11, 2018

(65) Prior Publication Data

US 2018/0332281 A1    Nov. 15, 2018

(30) Foreign Application Priority Data

May 15, 2017   (IN) .............................. 201741016978

(51) Int. Cl.
*H04N 19/107* (2014.01)
*H04N 19/124* (2014.01)
*H04N 19/176* (2014.01)
*H04N 19/91* (2014.01)
*H04N 19/177* (2014.01)
(Continued)

(52) U.S. Cl.
CPC ......... *H04N 19/107* (2014.11); *H04N 19/124* (2014.11); *H04N 19/139* (2014.11); *H04N 19/152* (2014.11); *H04N 19/172* (2014.11); *H04N 19/176* (2014.11); *H04N 19/177* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 2003/0007555 A1* | 1/2003 | Divakaran | G06K 9/00711 375/240.01 |
| 2005/0036548 A1* | 2/2005 | He | H04N 19/172 375/240.12 |

(Continued)

OTHER PUBLICATIONS

Fang H-C., et al., "Hardware Oriented Rate Control Algorithm and Implementation for Realtime Video Coding," Proceedings of the 2003 International Conference on Multimedia and Expo: Jul. 6-9, 2003, Baltimore Marriott Waterfront Hotel, Baltimore, Maryland, USA, IEEE Operations Center, US, Jul. 6, 2003, vol. 3, XP032963429, DOI: 10.1109/ICME.2003.1221338 ISBN: 978-0-7803-7965-7, pp. 421-424.

(Continued)

*Primary Examiner* — Rebecca A Volentine
(74) *Attorney, Agent, or Firm* — Shumaker & Sieffert, P.A.

(57) ABSTRACT

This disclosure describes techniques for achieve high coding efficiency by periodically encoding anchor frames with a lower Quantization Parameter (QP) to provide better prediction for the following frames. Techniques include adaptively deciding which frames are encoded with lower QP by use of the collected encoding statistics via an encoding scheme with or without rate control.

26 Claims, 9 Drawing Sheets

(51) Int. Cl.
*H04N 19/139* (2014.01)
*H04N 19/172* (2014.01)
*H04N 19/152* (2014.01)

(56) References Cited

U.S. PATENT DOCUMENTS

| | | | | |
|---|---|---|---|---|
| 2005/0226331 A1* | 10/2005 | Mohamed | ............... | G11B 27/28 375/240.16 |
| 2007/0274384 A1* | 11/2007 | Schwarz | ............... | H04N 19/176 375/240.12 |
| 2009/0067493 A1* | 3/2009 | Jun | ...................... | H04N 19/159 375/240.03 |
| 2015/0215621 A1* | 7/2015 | Liu | ...................... | H04N 19/124 375/240.03 |
| 2015/0364158 A1* | 12/2015 | Gupte | ................. | G11B 27/3081 386/223 |
| 2015/0373328 A1* | 12/2015 | Yenneti | ................... | H04N 19/61 375/240.03 |
| 2016/0037170 A1* | 2/2016 | Zhang | ................... | H04N 19/142 375/240.12 |

OTHER PUBLICATIONS

International Search Report and Written Opinion—PCT/US2018/032578—ISA/EPO—dated Aug. 9, 2018.

Mitchell J.L., et al., "Chapter 15: Rate Control in MPEG," Oct. 31, 1996, MPEG Video Compression Standard, Chapman & Hall, New York, NY (USA), XP002687352, ISBN: 0-412-08771-5, pp. 333-356.

Rezaei M., et al., "Semi-Fuzzy Rate Controller for Variable Bit Rate Video," IEEE Transactions on Circuits and Systems for Video Technology, Institute of Electrical and Electronics Engineers, USA, May 1, 2008, vol. 18, No. 5, XP011204598, ISSN: 1051-8215, pp. 633-645.

Shih C.H., et al., "An integrated rate control scheme for TCP-friendly MPEG-4 video transmission," Signal Processing, Image Communication, Elsevier Science Publishers, Amsterdam, NL, Dec. 26, 2007, vol. 23, No. 2, XP022475746, ISSN: 0923-5965, DOI: 10.1016/J.IMAGE.2007.11.003, pp. 101-115.

Wang P., et al., "Region-Classification-Based Rate Control for Flicker Suppression of I-Frames in HEVC," 2013 IEEE International Conference on Image Processing, IEEE, Sep. 15, 2013, XP032966021, DOI:10.1109/ICIP.2013.6738409 [retrieved on Feb. 11, 2014], pp. 1986-1990.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

U.S. Appl. No. 15/940,349, filed by Yang Yu, filed Mar. 29, 2018.
U.S. Appl. No. 15/940,393, filed by Yang Yu, filed Mar. 29, 2018.

* cited by examiner

ADAPTIVE ANCHOR FRAME AND QUANTIZATION PARAMETER DECISION IN VIDEO CODING

This application claims the benefit of Indian Provisional Patent Application 201741016978, filed May 15, 2017, the entire content of which is incorporated by reference.

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as CTUs, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques for an adaptively determining and encoding anchor frames and determining a quantization parameter (QP) of each frame in video coding. To achieve higher coding efficiency, a video encoder may periodically encode some frames (e.g., anchor frames) with a lower QP to provide better prediction for the following frames. In some examples, anchor frames are inserted non-adaptively without considering the characteristics of the scene depicted in the image or the type of device that produce the image data. According to techniques of the present disclosure, a video coding device may adaptively determine which frames are to be encoded with a lower QP, and thus a higher bit-allocation, than other frames by using collected encoding statistics. The present techniques may work with encoding schemes with and without rate control and achieve significant Bjøntegaard-Delta (BD)-rate gain.

In one example of the disclosure, method of encoding video data, the method includes determining a current frame of video data is an anchor frame, when the current frame is determined to be the anchor frame, determining an anchor frame bit allocation and a first quantization parameter (QP) using coding statistics from a previous frame, encoding the current frame based on the determined first QP, collecting coding statistics from the current frame, determining a next frame of video data is a non-anchor frame, when the next frame is determined to be the non-anchor frame, determining a non-anchor frame bit allocation and a second QP using coding statistics from the current frame, encoding the current frame based on the determined second QP, and collecting coding statistics from the next frame.

In another example of this disclosure, a video encoding device includes a video data memory configured to store a current frame of video data, and processing circuitry in communication with the video data memory. The processing circuitry is configured to determine a current frame of video data is an anchor frame, when the current frame is determined to be the anchor frame, determine an anchor frame bit allocation and a first QP using coding statistics from a previous frame, encode the current frame based on the determined first QP, collect coding statistics from the current frame, determine a next frame of video data is a non-anchor frame, when the next frame is determined to be the non-anchor frame, determine a non-anchor frame bit allocation and a second QP using coding statistics from the current frame, encode the current frame based on the determined second QP, and collect coding statistics from the next frame.

In another example of this disclosure, an apparatus for of encoding video data, the apparatus includes means for determining a current frame of video data is an anchor frame, means for determining, when the current frame is determined to be the anchor frame, an anchor frame bit allocation and a first QP using coding statistics from a previous frame, means for encoding the current frame based on the determined first QP, means for collecting coding statistics from the current frame, means for determining a next frame of video data is a non-anchor frame, means for determining, when the next frame is determined to be the non-anchor frame, a non-anchor frame bit allocation and a second QP using coding statistics from the current frame, means for encoding the current frame based on the determined second QP, and means for collecting coding statistics from the next frame.

In another example of this disclosure, a non-transitory computer-readable storage medium encoded with instructions that, when executed, cause one or more processors of a video encoding device to determine a current frame of video data is an anchor frame, when the current frame is determined to be the anchor frame, determine an anchor frame bit allocation and a first QP using coding statistics from a previous frame, encode the current frame based on the determined first QP, collect coding statistics from the current frame, determine a next frame of video data is a non-anchor frame, when the next frame is determined to be the non-anchor frame, determine a non-anchor frame bit allocation and a second QP using coding statistics from the current frame, encode the current frame based on the determined second QP, and collect coding statistics from the next frame.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
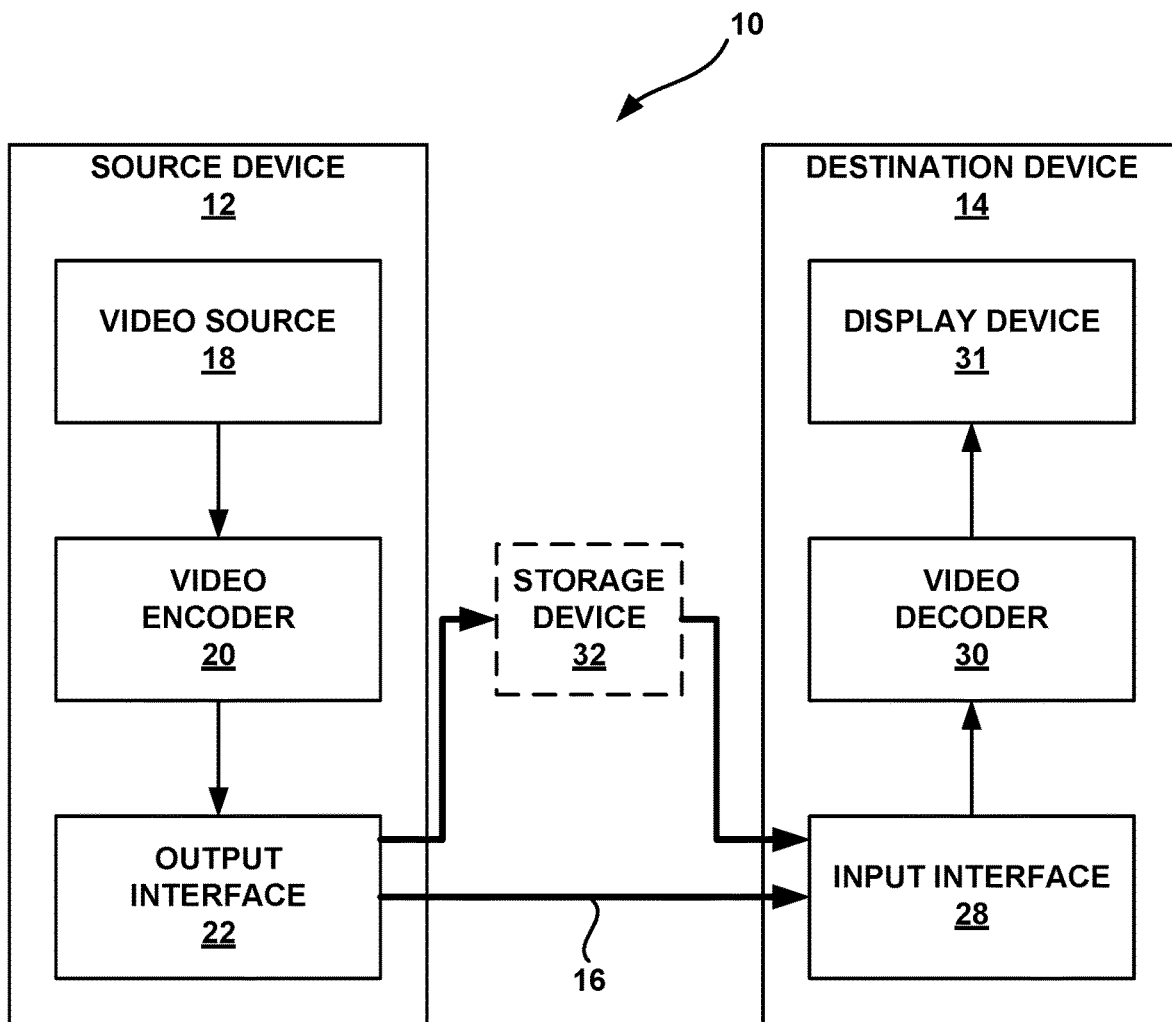
FIG. 1 is a block diagram illustrating an example video encoding and decoding system that may implement the techniques described in this disclosure.

Block-based hybrid video coding frameworks are widely used in video coding standards such as MPEG-2, H.264/AVC and HEVC. For example, in HEVC, a video frame is divided into blocks of different sizes called CU (coding unit). Each CU may be split into smaller blocks as prediction unit (PU) for prediction or transform unit (TU) for transform. Each PU is predicted either within the current frame in the case of intra mode or from the temporally neighboring frames in the case of inter mode. The prediction error is transformed, quantized and coded using entropy coding techniques such as CABAC. Techniques of this disclosure describe methods that may achieve high coding efficiency by periodically encoding some frames (e.g., anchor frames) with lower quantization parameter (QP) compared with other frames to provide better prediction for the frames that follow via smart bit allocation based on video encoding statistics. A QP is a parameter that regulates how much spatial detail is saved in a lossy-video encoding process. When the QP is a small value, more detail is retain compared to when the QP is a larger value. QP may be varied at different levels (e.g., frame level, slice level, or block level). In some examples, the QP may be an integer value between 0 and 51. In other examples, QP may be a decimal or floating-point value. QP may be used to derive a scaling matrix.

This disclosure describes techniques for smart bit allocation in a video encoding process. Video frames may be highly correlated temporally, particularly in applications such as video telephony (VT) and video surveillance. Some examples of video encoding use a low-delay coding structure called hierarchical P. In hierarchical P, there are anchor frames encoded with a lower QP and frames in between called non-anchor frames that are encoded with a higher QP. Anchor frames are encoded with a lower QP to serve as higher quality reference frames, as other frames may be predicted from anchor frames. The anchor frames encoded with a lower QP may provide a good prediction with low distortion. In such cases, even though non-anchor frames are allocated with a higher QP, due to the propagation effects of motion compensated prediction, a non-anchor frame encoded to predict based on the anchor frame can still achieve a low distortion with a small number of bits. In some examples, an anchor frame may be defined as the first picture of a group of pictures (GOP). A GOP is a group of coding pictures with fixed coding structure, specific coding order and defined dependencies between the pictures. According to aspects of the present disclosure, the GOP size is not fixed, and may change based on video content.

In hierarchical P examples, however, the configuration of anchor frames may be fixed. For example, every four frames, a video encoder may insert and encode an anchor frame. In real video sequences, there may exist low motion or static sequence segments and sequence segments with a lot of motion. For static sequence segments, a longer GOP size, or fewer anchor frames are expected to achieve the best coding efficiency. For sequence segments with a lot of motion, GOP size may be selected to be shorter, or more anchor frames may be inserted. The disclosed techniques include adaptively determining, by a video encoder, whether a frame is selected as an anchor or non-anchor frame based on the statistics collected from encoding previous frames. In addition, bit allocation and QP decision schemes are disclosed herein.

FIG. 1 is a block diagram illustrating an example video encoding and decoding system 10 that may utilize the adaptive anchor frame and QP determination techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure to use adaptive anchor frame decisions and QP decisions may give the best compression for specific sequences with static scenes, such as IP camera sequences, but are not necessarily limited to any specific application or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. In another example, video source 18 may include an IP camera. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 31 may be integrated with, or external to, destination device 14. In some examples, destination device 14 may include an integrated display device and be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC developed the HEVC standard based on an evolving model of a video coding device referred to as the HEVC Test Model (HM). The HM presumed several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. One draft of the HEVC standard, referred to as "HEVC Working Draft 10" or "WD10," is described in document JCTVC-L1003v34, Bross et al., "High efficiency video coding (HEVC) text specification draft 10," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which, as of Apr. 8, 2013, is downloadable from http://phenix.int-evry.fr/jct/doc_end_user/documents/12_Geneva/wg11/JCTVC-L1003-v34.zip. The entire content of HEVC WD10 is hereby incorporated herein by reference.

In general, the working model of the HM described that a video frame or picture may be divided into a sequence of coding tree units (CTUs) or largest coding units (LCU) that include both luma and chroma samples. A CTU has a similar purpose as a macroblock of the H.264 standard. A slice includes a number of consecutive CTUs in coding order. A video frame or picture may be partitioned into one or more slices. Each CTU may be split into coding units (CUs) according to a quadtree. For example, a CTU, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a CTU may be split, and may also define a minimum size of the coding nodes.

A CU includes a coding node, as well as prediction units (PUs) and transform units (TUs) associated with the coding node. A size of the CU corresponds to a size of the coding node and may be square in shape. The size of the CU may range from 8×8 pixels up to the size of the CTU with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a CTU, i.e., LCU, or a CU, which includes a coding node and PUs and TUs.

A video sequence typically includes a series of video frames or pictures. A GOP generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. As will be explained in more detail below, a quantization parameter may be used to determine a rate model parameter determined in accordance with the techniques of this disclosure.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not.

As will be explained in more detail below, video encoder 20 of FIG. 1 may be configured to decide whether the video frame is an anchor frame or not. In addition, video encoder 20 may determine a QP for the frame using the collected statistics (e.g., from previous frames). After the video frame finishes encoding, the encoding statistics are collected. The encoding statistics may be used in anchor frame decision and decision of the encoding parameters such as bit allocation or QP. Video encoder 20 may collect statistics including the number of intra/inter 8×8 blocks, the sum of absolute values of motion vector amplitudes in both horizontal and vertical directions, and the percentage of skipped 8×8 blocks. These statistics may be used to determine whether the previous frames are from static scenes or are scenes that have a threshold amount of motion. Based on this past encoding information, video encoder 20 can adaptively decide whether to encode the current frame as an anchor frame or not.

As will be explained in more detail below, video encoder 20 of FIG. 1 may be configured to encode the frame with a determined QP once the anchor frame is decided. In some examples, when the video sequence is quite static without much new content appearing in the frame relative to pervious frames, the anchor frame may be encoded with a lower QP. In these examples, the low distortion anchor frame content is propagated to the following non-anchor frames. When there is a lot of motion or new content appearing, or a scene change, the anchor frame should not be encoded with very low QP, because the temporal correlation is low between frames. In examples where rate control is not used, video encoder 20 may encode video frames with a constant QP. Video encoder 20 may read such a constant QP from a configuration setting. In examples where rate control is used, video encoder 20 may consider a rate distortion model to determine the QP.

Figure 2:
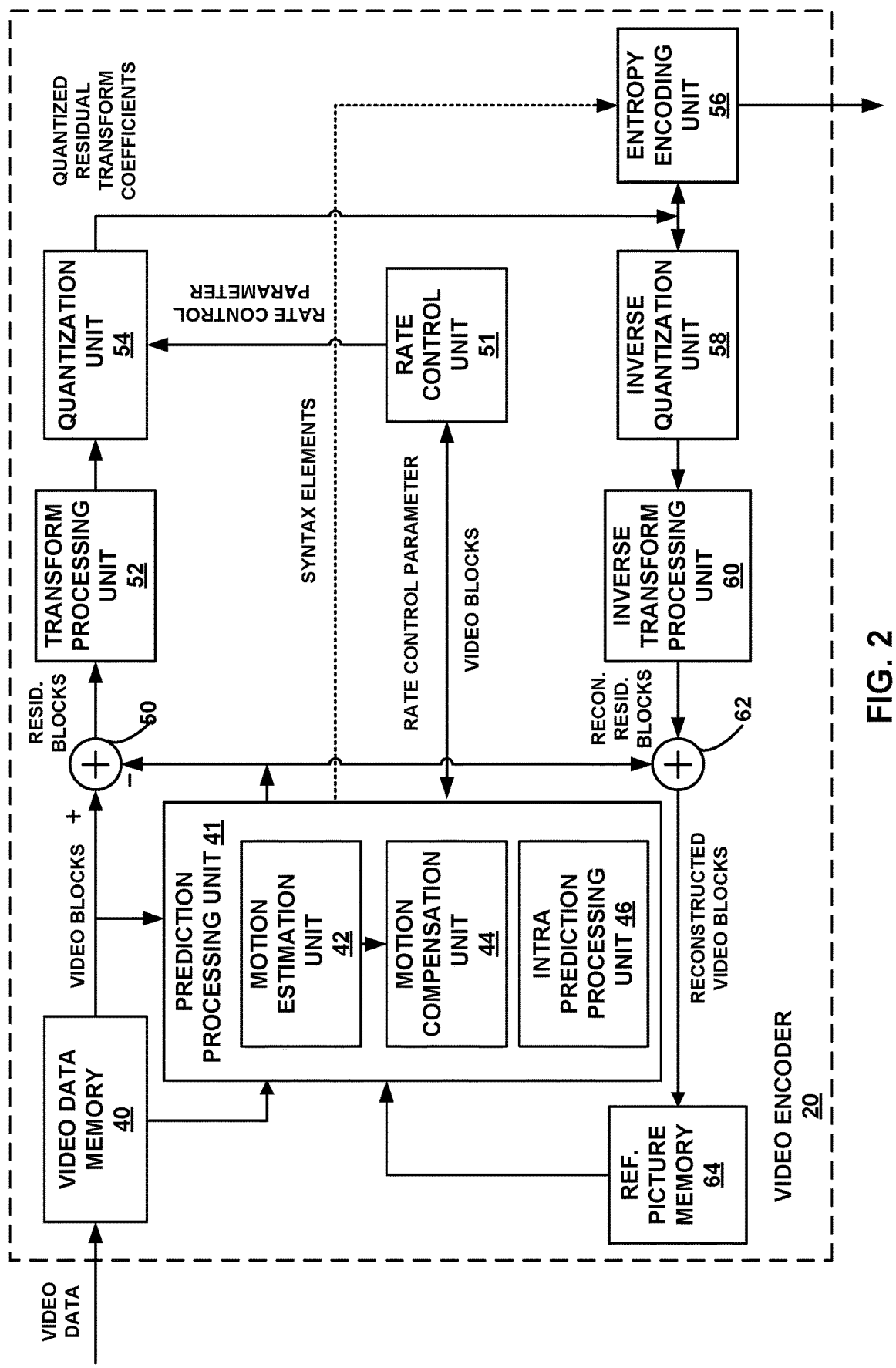
FIG. 2 is a block diagram illustrating an example video encoder that may implement the techniques described in this disclosure.

FIG. 2 is a block diagram illustrating an example video encoder 20 that may implement the adaptive anchor frame and QP decision techniques described in this disclosure. Video encoder 20 may be a hardware encoder or may encode using various other techniques, e.g., software. Video encoder 20 may be configured to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes video data memory 40, prediction processing unit 41, reference picture memory 64, summer 50, transform processing unit 52, quantization unit 54, rate control unit 51, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoded picture buffer (DPB) that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may perform intra-prediction on a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to a reference frame to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 may further include a rate control unit 51 which is configured to control the rate of video encoding (e.g., the number of bits that are used to represent the encoded video). Rate control unit 51 may control the rate of video encoding by determining a rate control parameter. The rate control parameter generated by rate control unit 51 may be used by both prediction processing unit 41 and quantization unit 54 to control the rate of video encoding. As will be explained in greater detail below, prediction processing unit 41 may use the rate control parameter in a rate-distortion analysis used to select a prediction mode (i.e., the best inter or intra prediction mode). In addition, quantization unit 54 may use the rate control parameter to determine a quantization parameter. Both the determined prediction mode and the quantization parameter affect the encoding rate of video encoder.

In accordance with the techniques of this disclosure, as will be explained in greater detail below, video encoder 20 may be configured to make adaptive anchor frame decisions. In an example, an anchor frame can be I frame or P frame. The anchor frame is selected to serve as a reference frame. To provide a better reference and provide less error propagation, video encoder 20 may set the QP of an anchor frame lower (compared to a non-anchor frame). In specific examples, in the case of an I frame, video encoder 20 may always set it as an anchor frame. For a P frame, video encoder 20 may decide whether the frame should be encoded as an anchor frame adaptively based on the collected coding statistics from encoding previous frames, as will be discussed in more detail below.

Figure 3:
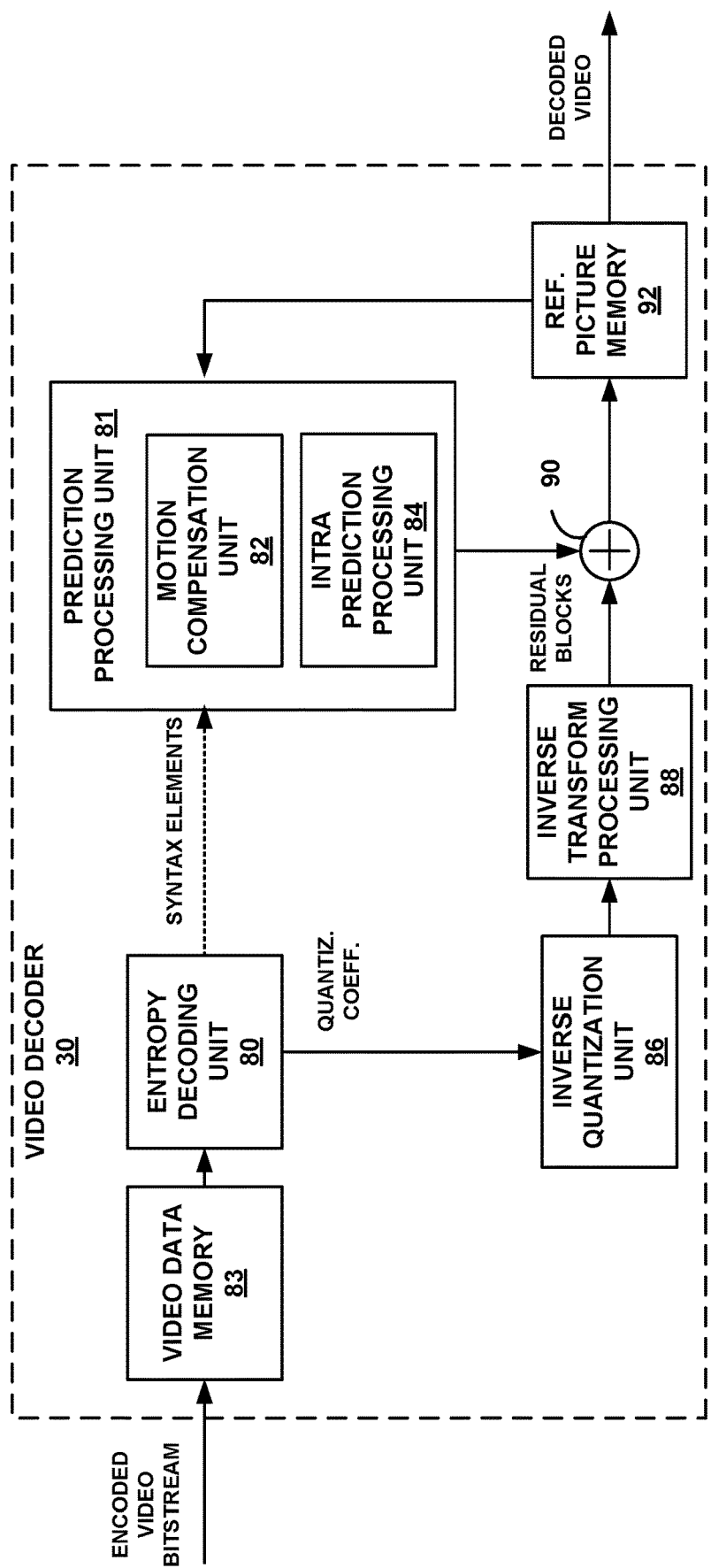
FIG. 3 is a block diagram illustrating an example video decoder.

FIG. 3 is a block diagram illustrating an example video decoder 30 that may decode the adaptive anchor frame described in this disclosure. In the example of FIG. 3, video decoder 30 includes video data memory 83, entropy decoding unit 80, prediction processing unit 81, inverse quantization unit 86, inverse transformation processing unit 88, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

Video data memory 83 may store video data to be decoded by the components of video decoder 30. The video data stored in video data memory 83 may be obtained, for example, from video encoder 20. Reference picture memory 92 is one example of a decoded picture buffer (DPB) that stores reference video data for use in decoding video data by video decoder 30 (e.g., in intra- or inter-coding modes, also referred to as intra- or inter-prediction coding modes). Video data memory 83 and reference picture memory 92 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 83 and reference picture memory 92 may be provided by the same memory device or separate memory devices. In various examples, video data memory 83 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

Figure 4:
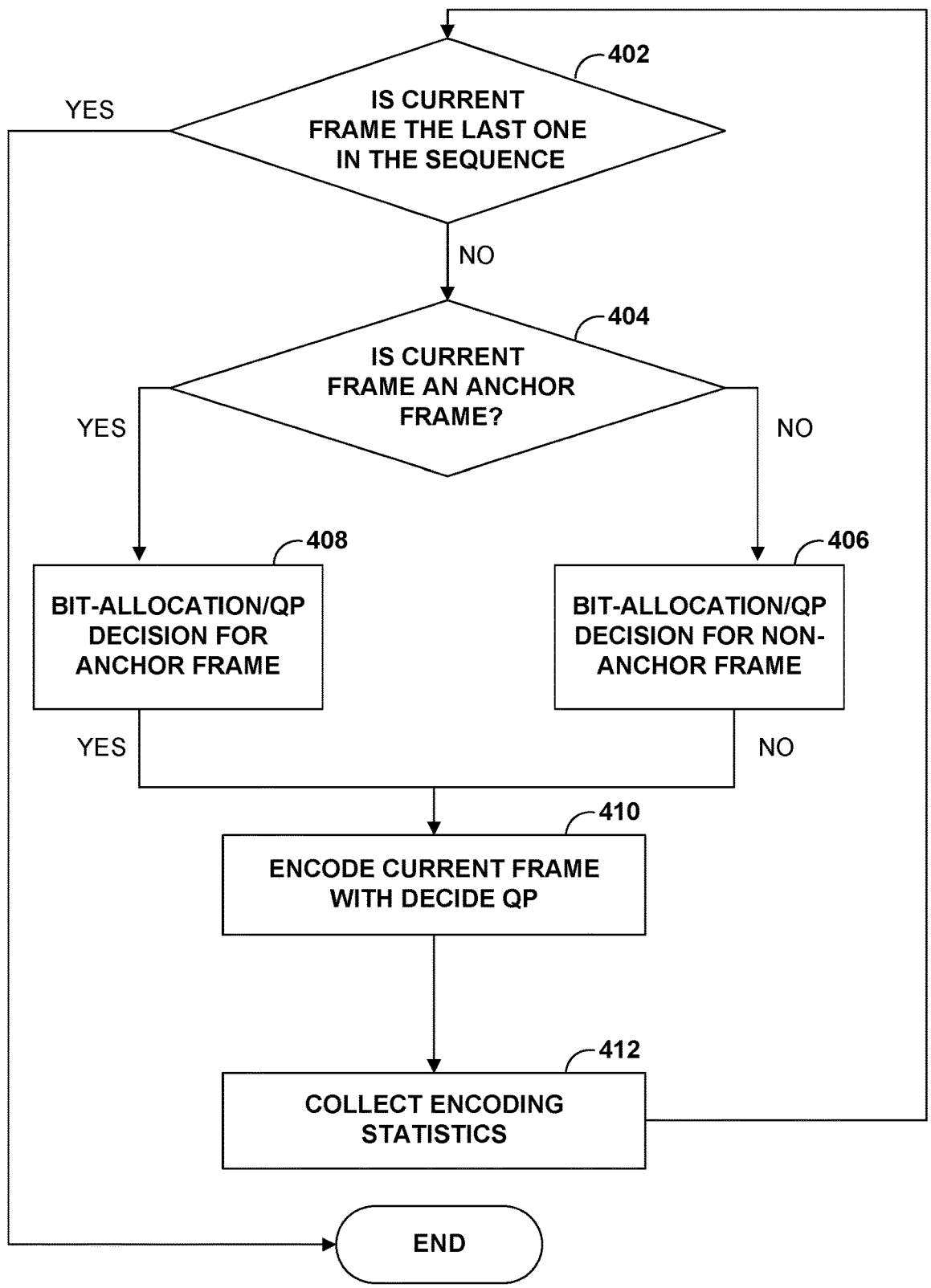
FIG. 4 is a flowchart illustrating an example method of illustrating an example method of adaptively determining anchor frames according to the techniques described in this disclosure.

FIG. 4 is a flowchart illustrating an example method of adaptively determining anchor frames. The techniques of FIG. 4 may be implemented by one or more components of video encoder 20.

In one example of the disclosure, video encoder 20 may be configured to determine whether the current frame is the last frame in the sequence (402). If the current frame is the last frame (402, "yes" branch), the method completes. If the current frame is not the last frame in the sequence (402, "no" branch), video encoder 20 may be configured to determine whether the current frame is an anchor frame. If the current frame is an anchor frame (404), video encoder 20 may be configured to perform a bit allocation and determine a QP value for anchor frames. If the current frame is a non-anchor frame (404, "no" branch), video encoder 20 may be configured to perform bit allocation and determine a QP value for non-anchor frames (406), further details of which are described below. If the current frame is an anchor frame (404, "yes" branch), video encoder 20 may be configured to perform bit allocation and determine a QP value for anchor frames (408), further details of which are described below. The anchor frame bit allocation allocates more bits to the anchor frame by assigning a lower QP value when encoding the anchor frame. The non-anchor frame bit allocation allocates relatively fewer bits to non-anchor frames to compensate for the overuse of bits when encoding anchor frames. Following the bit allocation and QP determination, video encoder 20 may be configured to encode the current frame with the decided QP (410). Encoding statistics are then collected by video encoder 20 (412). The encoding statistics may be used by video encoder 20 in future bit allocation and QP determination and to determine whether the next frame should be an anchor frame. For example, in certain circumstances such as sequences with low motion and/or high correlation video, there may be periods of low QP values. In the opposite circumstances, video encoder 20 may determine QP values should be high and/or more anchor frames should be used.

Video encoder 20 may collect encoding statistics during normal encoding including the number of intra/inter 8×8 blocks, the sum of absolute values of motion vector amplitudes in both horizontal and vertical directions, and the percentage of skipped 8×8 blocks. Video encoder 20 may use these statistics to determine whether the previous frames are from static scenes or have a lot of motion.

Figure 5:
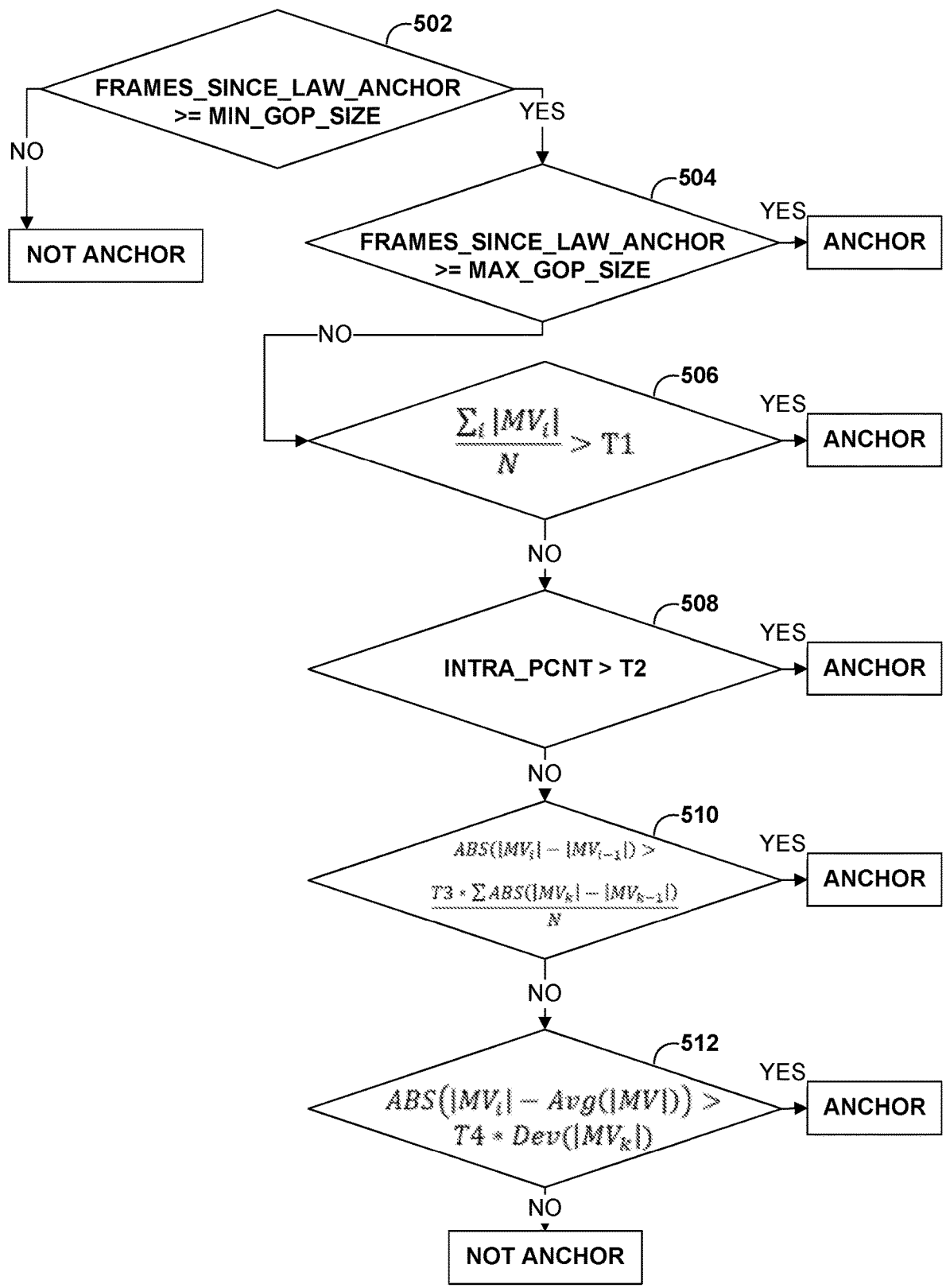
FIG. 5 is a flowchart illustrating an example method of determining whether a P-frame should be encoded as an anchor frame.

FIG. 5 is a flowchart illustrating an example method of determining whether a P-frame should be encoded as an anchor frame based on encoding statistics. The techniques of FIG. 5 may be implemented by one or more components of video encoder 20.

In examples of the techniques described herein, if anchor frames are determined to appear too often, it may increase the bit-rate unnecessarily or inefficiently. In other examples, if the number of frames since the last anchor frame is too large, too much encoding error may be accumulated and visual quality may be compromised.

Therefore, in some examples, when the number of frames since the last anchor frame is less than some predetermined minimum GOP size (MIN_GOP_SIZE) (502), no anchor frame is inserted (502, "no" branch). In an exemplary implementation, MIN_GOP_SIZE=4. In another example, if the number of frames since the last anchor frame is greater or equal to a predetermined a maximum GOP size (MAX_GOP_SIZE) (504), an anchor frame is inserted (502, "yes" branch). In an exemplary implementation, MAX_GOP_SIZE=16.

If the number of frames since the last anchor frame is in between of MIN_GOP_SIZE and MAX_GOP_SIZE, the average motion amplitude since the last anchor frame $$\frac{\sum_i |MV_i|}{N}$$

may be calculated by video encoder 20 and compared with a threshold T1 (506):

$$\frac{\sum_i |MV_i|}{N} > T1 \qquad (1)$$

$MV_i$ refers to the motion vector amplitude for ith frame. $MV_i$ is the sum of motion vector amplitudes in x direction and y direction of all the 8×8 blocks in the ith frame. $\Sigma_i |MV_i|$ refers to the sum of the motion vector amplitudes for the ith frame. N refers to the number of frames since the last anchor frame. Threshold T1 may be set, in some examples, to be equal to (imageWidth+imageHeight)/4, where imageWidth and imageHeight are the width and height of the video frame. Where the average motion amplitude since the last anchor frame is greater than the threshold value T1 (506, "yes" branch), video encoder 20 may determine that since the last anchor frame, a large amount of motion has accumulated. Video encoder 20 may determine that the current frame will be encoded as an anchor frame. If video encoder 20 determines that there is a large percentage of intra-coded blocks in the last frame compared to a threshold value (e.g., where Intra_pcnt>T2) (508, "yes" branch), video encoder 20 may determine that there may be a scene change in the video sequence and the current frame is encoded as an anchor frame so that a better prediction may be provided for the following frames. Threshold T2 may be set, in some examples, to be equal to 60%.

Where the last two frames have a large motion change (510 and 512, "yes" branches), then current frame will be encoded as an anchor frame as shown:

$$\text{ABS}(|MV_i| - |MV_{i-1}|) > \frac{T3 * \Sigma \text{ABS}(|MV_k| - |MV_{k-1}|)}{N} \quad (2)$$

or as shown:

$$\text{ABS}(|MV_i| - \text{Avg}(|MV|)) > T4 * \text{Dev}(|MV_k|) \quad (3)$$

where ABS( ) is the absolute value function. In some example implementations T3 is set to 6 and T4 is set to ⅓. $MV_i$ is sum of the motion vector amplitudes of the last frame, and Avg(|MV|) is the average of the sum of the motion vector amplitudes in the frames since the last anchor frame, where:

$$\text{Avg}(|MV|) = \frac{\sum_i |MV_i|}{N} \quad (4)$$

Dev(|MV|) is the standard deviation of the motion vector amplitudes in the frames since the last anchor frame and $$\text{Dev}(|MV|) = \frac{1}{N} \sum_i (|MV_i| - \text{Avg}(|MV|)) \quad (5)$$

In some example implementations T3 is set to 6 and T4 is set to ⅓. Video encoder 20 may be configured to determine if there is a lot of motion in the frame, using, e.g., inequalities 2 and 3. Where these inequalities are satisfied, video encoder 20 may be configured to determine the current frame should be encoded as an anchor frame. Video encoder 20 may then determine that the current frame should be encoded as a non-anchor frame if none of the foregoing conditions were not met (512, "no" branch).

Figure 6:
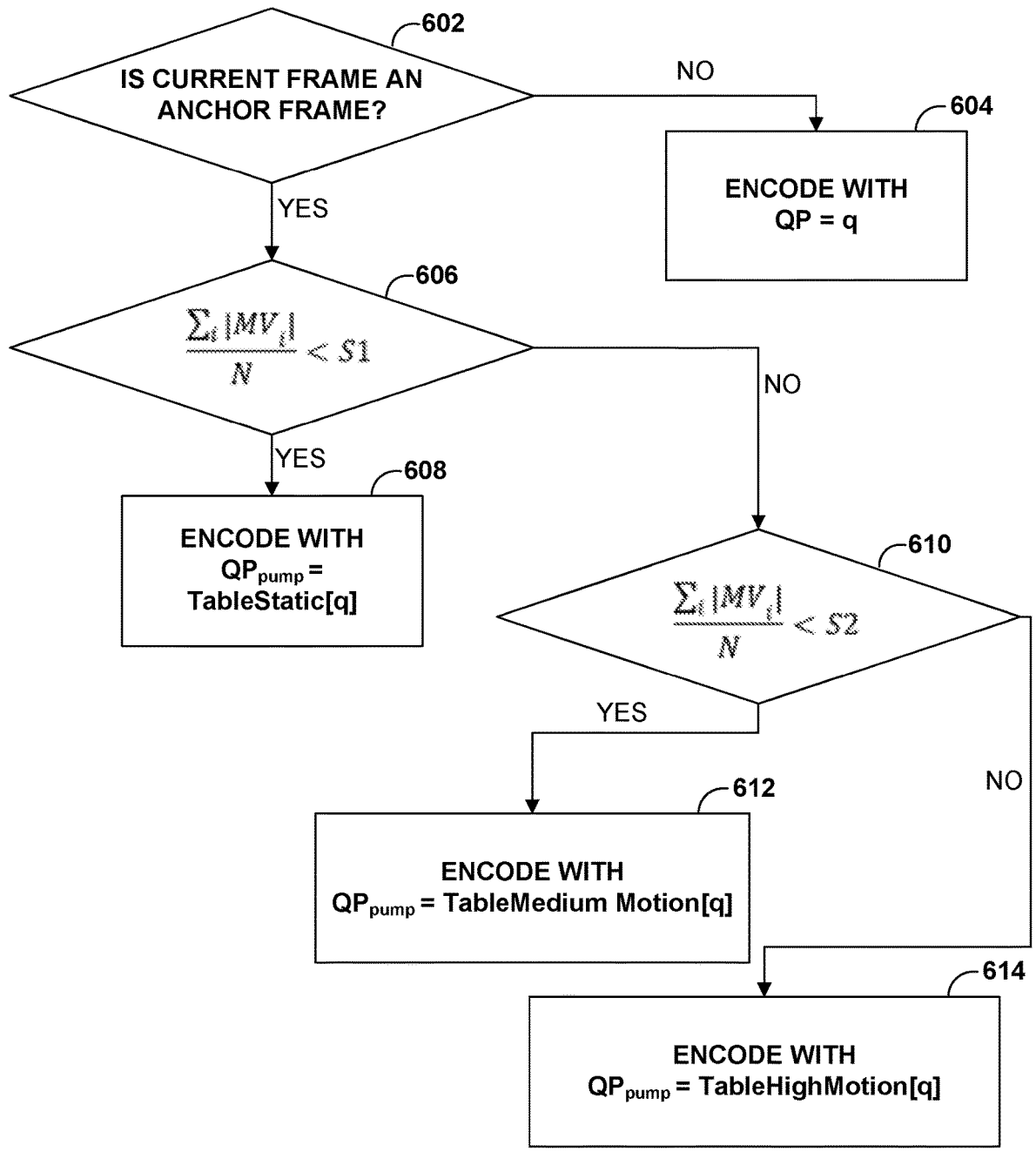
FIG. 6 is a flowchart illustrating an example method of selection of QP for an anchor frame when there is no rate control.

FIG. 6 is a flowchart illustrating an example method of determination of a QP value for an anchor frame when rate control is not used. The techniques of FIG. 6 may be implemented by one or more components of video encoder 20.

In one example of the disclosure, video encoder 20 may be configured to determine whether the current frame is (or is not) an anchor frame (602). If the current frame is not an anchor frame and there is no rate control (602, "no" branch), video encoder 20 may be configured to encode the current frame with a QP of q, where q is a set by some other configuration data stored by video encoder 20 (604). In an exemplary HEVC use case, four QP points 22, 25, 27, 32 are tested. For low delay configuration, I-frames and anchor frames are set to a lower QP, non-anchor frames are set to a QP of 22, 25, 27, or 32.

Once a frame is determined to be encoded as an anchor frame by video encoder 20 (602 "yes" branch), video encoder 20 determines the QP. In some implementations, where the video is relatively static without much new content appearing in the frames, the anchor frame may be encoded with a lower QP. This allows for the low distortion anchor frame content is propagated to the following non-anchor frames which may aid in inter-frame prediction with the anchor frame. When there is a lot of motion or new content appearing or many of scene changes, the anchor frame may not be encoded by video encoder 20 with very low QP, because the temporal correlation is low between frames.

When rate control is not used by video encoder 20, in some examples video frames may be encoded by video encoder 20 with a constant QP which is read from the configuration settings. Video encoder 20 may classify the video sequence into multiple categories (e.g., 3) based on the collected encoding statistics and the average motion vector amplitude and decide the QP for the current frame based on the classification results. Assume with regular encoding current video frame should be encoded with QP=q, where q is set by some configuration. If the average motion vector amplitude of the frames since the last anchor frame is less than a threshold S1 (606, "yes" branch), shown in the following inequality $$\frac{\sum_i |MV_i|}{N} < S1 \quad (6)$$

then video encoder 20 may use the lookup table TableStatic to get the QP=TableStatic[q] to encode the current anchor frame (608). Otherwise (606, "no" branch), if the average motion vector amplitude of the frames since the last anchor frame is less than a threshold S2 (610, "yes" branch), shown in the following inequality $$\frac{\sum_i |MV_i|}{N} < S2 \quad (7)$$

then video encoder 20 may use the lookup table TableMediumMotion to get the QP=TableMediumMotion [q] to encode the current anchor frame (612). Otherwise (610, "no" branch), video encoder 20 may use the lookup table TableHighMotion to get the QP=TableHighMotion [q] to encode the current frame (614).

In an exemplary implementation, look up tables TableStatic, TableMediumMotion, and TableHighMotion may be set as follows:

```
Int8  ganQPTabStatic[52] = {
0, 1, 2, 3, 4, 5, 6, 7, 8, 9, 10,
10,10,10,10,11,12,13,14,15,16,17,
18,19,20,21,21,22,22,23,23,24,25,
26,27,27,28,28,29,29,30,31,32,33,
34,35,36,37,38,39,40,41};
```

```
Int8    ganQPTabMediumMotion[52]={
0, 1, 2, 3, 4, 5, 6, 7, 8, 9, 10,
11,11,12,13,14,14,15,16,17,17,18,
19,20,21,22,23,23,24,25,25,26,27,
27,28,29,31,32,33,34,35,35,35,36,
36,36,37,37,38,39,40,41};
```

```
Int8    ganQPTabHighMotion[52]={
0, 1, 2, 3, 4, 5, 6, 7, 8, 9, 10,
11,12,13,14,14,15,16,17,18,18,19,
20,21,22,23,24,24,25,26,27,27,28,
29,29,30,31,33,34,35,35,35,36,36,
37,37,38,38,38,39,40,41};
```

For static scenes, the QP of the anchor frame may have a large gap between the configured QP and the "pumped" QP. Pumped refers to increasing the resultant bits of a frame or that more bits are allocated to the frame by assigning a low QP. For scenes with the highest motion, the gap between the configured QP the "pumped" QP may be the smallest among the three cases.

Thresholds S1 and S2 may be empirically set as follows:

$$S1 = \frac{(imageWidth + imageHeight)}{300} \quad (8)$$

$$S2 = \frac{(imageWidth + imageHeight)}{120} \quad (9)$$

Figure 7:
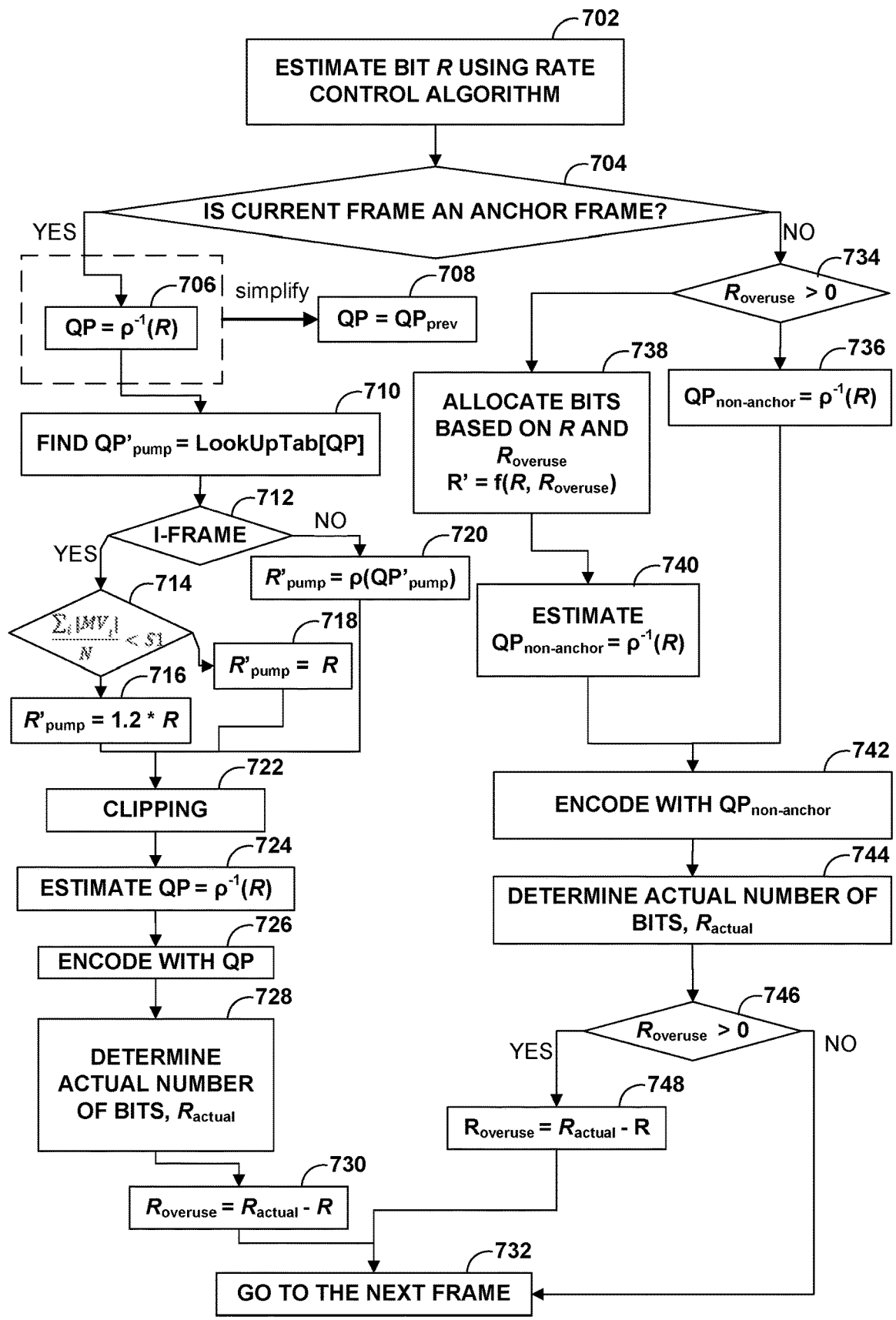
FIG. 7 is a flowchart illustrating an example method of bit allocation and QP determination for both anchor and non-anchor frames using rate control according to techniques of the present disclosure.

In other examples, video encoder 20 uses rate control. FIG. 7 is a flowchart illustrating an example method of bit allocation and QP determination for both anchor and non-anchor frames using rate control according to techniques of the present disclosure. The techniques of FIG. 7 may be implemented by one or more components of video encoder 20. Rate control may ensure the encoded bitstream satisfies the requirements of the communication channel so that the bitstream can be successfully transmitted. Rate control may use a rate distortion model defined by the equation $$R = \rho(QP) \quad (10)$$

Equation 10 models the relationship between the bits used and encoding parameter QP. This rate distortion model may be estimated by video encoder 20 during encoding by collecting encoding statistics. In an example, video encoder 20 begins with a predetermined rate distortion model R=ρ(QP). Current bit allocation and QP decision for anchor and non-anchor frames are made, by video encoder 20, to fit in the rate control framework with the rate distortion model R=ρ(QP).

Video encoder 20 estimates the number of bits R needed for encoding the current frame using the rate control algorithm (702). In some examples, the number of bits needed for the frame to be encoded is estimated based on the buffer fullness and frame complexity. If the current frame is an anchor frame (704, "yes" branch), video encoder 20 may estimate a QP value (706) using the reverse rate distortion model $\rho^{-1}$ $$QP = \rho^{-1}(R) \quad (11)$$

Due to the temporal correlation of video frames, this model may be simplified (708) by video encoder 20 by setting the QP equal the QP of the previous frame ($QP_{prev}$), that is, $$QP = QP_{prev} \quad (12)$$

Please note that encoding with this QP value will not result in a "pumped" anchor frame. To make the anchor frame "pumped," video encoder 20 should allocate more bits to the anchor frame. Based on the sequence characteristics, video encoder 20 may encode the frame with $QP'_{pump}$=LookUpTab[QP] (710). Here the LookUpTab can be TableStatic, TableMediumMotion or TableHighMotion depending on the characteristics of the scene (as described above in reference to FIG. 6).

Video encoder 20 may handle the bit allocation and QP decision differently for I-frames and P-frames. In some examples, I-frames are periodically inserted in real applications. I-frames may use more bits to encode and may be allocated more bits to achieve temporal propagation. The tradeoff, however, is that if too many bits are allocated to I-frames, the bit-rate requirement of rate control may not be met. Therefore, in some examples, for I-frames, video encoder 20 is configured to use a fixed pumping scheme. When a frame is an intra-coded frame (712, "yes" branch), and video encoder 20 determines that the current scene is relatively static (e.g., low motion in the frame) (714), that is, by using the following inequality:

$$\frac{\sum_i |MV_i|}{N} < S1 \quad (13)$$

If it is quite static (714, "yes" branch), video encoder 20 may pump the bits of an I-frame by 1.2 times (716) using the formula $$R'_{pump} = 1.2 * R \quad (14)$$

Otherwise (714, "no" branch) video encoder 20 may use the bit number estimated from rate control (718), that is, $$R'_{pump} = R \quad (15)$$

For anchor frames of P-frame type (712, "no" branch), video encoder 20 may then estimate the needed bits $R'_{pump}$ (720) for $QP'_{pump}$ using the rate distortion model $$R'_{pump} = \rho(QP'_{pump}) \quad (16)$$

Video encoder 20 may further clip the needed bits for an anchor frame of P-frame type or I-frame type by scaling up the bits R by a factor α (722). The scaling factor α may be a function of temporal distance between current anchor frame and the previous anchor frame. The scaling factor α may be smaller for smaller temporal distance and larger of higher temporal distance. Video encoder 20 may use the scaling factor α to limit the instantaneous peak bitrate overshoots caused by the higher anchor frame sizes if the anchor frames are generated too often. For example, let t be the temporal distance between the current anchor frame and the previous anchor frame, the final pump bits $R_{pump}$ may be clipped by video encoder 20 as $$R'_{pump} = MIN(R'_{pump}, \alpha * R) \quad (17)$$

or as $$R'_{pump} = \alpha * R \quad (18)$$

where, α=f(t). In examples where the max distance between two anchor frames(MAX_GOP_SIZE) is 16, f(t) may be selected as follows: UInt32 BitRatio[MAX_ANCHOR_D-ISTANCE+1]={1, 1, 1, 1, 2, 2, 2, 3, 3, 4, 4, 5, 5, 6, 6, 7, 7};

In rate control, to satisfy the requirement of the transmission channel, the bit use may be required to be within a certain limit. The bits may go through a clipping function clip(•), by video encoder 20, so the final pump bits $R_{pump}$ may be calculated as $$R_{pump} = \text{clip}(R'_{pump}) \quad (19)$$

Here the clipping function clip(•) is part of the rate control algorithm. Depending on whether it is variable bitrate (VBR) or constant bitrate (CBR), the clipping may be different. Estimated bits may be clipped so that the requirement of the rate control is met and the bit stream can successfully get transmitted. The present algorithm is fit for both VBR and CBR, as long as the allocated bit has gone through the corresponding clipping.

Video encoder 20 may estimate (or calculate) the QP to encode the frame:

$$QP = \rho^{-1}(R_{pump}) \quad (20)$$

using the reverse rate distortion model (724). Video encoder 20 may encode the frame with the determined QP (726). The anchor frame may be encoded with QP, which may result in a larger bigger bit number than originally estimated rate number R. Video encoder 20 may determine the number of bits actually used to encode the frame, $R_{actual}$ (728). The anchor frame is encoded with an over budget of $R_{overuse}$, and may be calculated (730) with the formula $$R_{overuse} = R_{actual} - R \quad (21)$$

$R_{overuse}$ may be used by video encoder 20 later in calculating the bits for the next non-anchor frame(s). The method may then go to the next frame (732).

For a non-anchor frame (704, "no" branch), if $R_{overuse} \leq 0$ (734, "no" branch), the non-anchor frame is encoded as usual, e.g., video encoder 20 may determine the QP value to be equal to $\rho^{-1}(R)$ (736). If $R_{overuse} > 0$ (734, "yes" branch), the anchor frame has over-used the bit budget and video encoder 20 may need to compensate this overuse so that the bit-rate requirement is met In one example, bit budget overuse is defined within a 1 second window. Video encoder 20 may allocate bits based on R and $R_{overuse}$ (738), using the following formula:

$$R' = f(R, R_{overuse}) \quad (22)$$

The QP may be estimated (740) using the following formula:

$$QP_{non\text{-}anchor} = \rho^{-1}(R') \quad (23)$$

In an exemplary bit allocation for non-anchor frames, the non-anchor frame that is right after the anchor frame can be allocated the least number of bits because it is closest to the anchor frame and can take the best advantage of the good prediction provided by the anchor frame. Based on the above rule of thumb, an exemplary bit allocation scheme is as show in FIG. 8.

In another exemplary bit allocation, the over used bits ($R_{overuse}$) will be compensated uniformly across all the future non-anchor frames.

Video encoder 20 may encode the frame with $QP_{non\text{-}anchor}$ (742) and determine the actual number of bits used in the encoding of the frame, $R'_{actual}$ (744). If $R_{overuse} > 0$ (as calculated prior in step 734) (746, "yes" branch), then update $R_{overuse}$ based on $R'_{actual}$ (748), using the formula:

$$R_{overuse} = R_{overuse} + R'_{actual} - R \quad (24)$$

The method then may go to the next frame (732).

Figure 8:
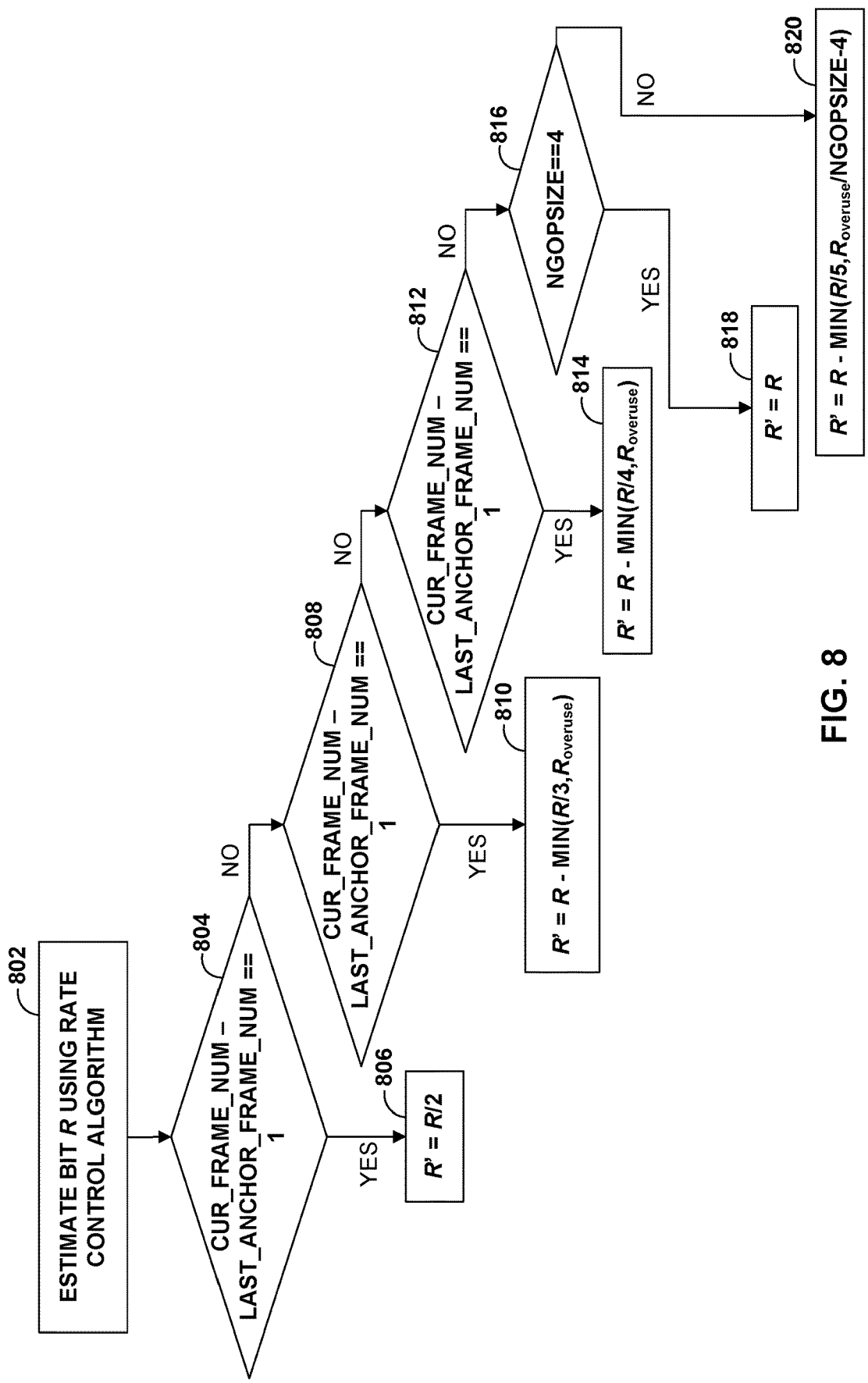
FIG. 8 is a flowchart illustrating an example method of bit allocation for a non-anchor frame according to techniques of the present disclosure.

FIG. 8 is a flowchart illustrating an example method of bit allocation for a non-anchor frame according to techniques of the present disclosure. The techniques of FIG. 8 may be implemented by one or more components of video encoder 20. The farther away the non-anchor frame is from the anchor frame, the more bits may be allocated. Bit R may be estimated using a rate control algorithm (802). For the frame right after the anchor frame, that is, when cur_frame_num–last_anchor_frame_num is 1 (804, "yes" branch), video encoder 20 may reduce the bit number by half (806). When cur_frame_num–last_anchor_frame_num is 2 (808), video encoder 20 may reduce the bit number by $\min(R/3, R_{overuse})$ (810). When cur_frame_num–last_anchor_frame_num is 3 (812), video encoder 20 may reduce the bit number by $\min(R/4, R_{overuse})$ (814). When cur_frame_num–last_anchor_frame_num is greater than 3, if the last GOP size (here GOP size is the distance between the last two anchor frames.) is 4 (816), video encoder 20 may determine that the next anchor frame may be approaching (with the assumption is that GOP size does not change significantly between neighboring GOPs), so video encoder 20 may not do any further bit reduction (818). Otherwise (816, "no" branch), video encoder 20 may reduce the bit number by $$\min\left(R/5, \frac{R_{overuse}}{(nGopSize - 4)}\right). \quad (820)$$

In this way, video encoder 20 may guarantee that most of the time the rate requirement can be met.

In some examples, video encoder 20 may use a simplified procedure for bit allocation for non-anchor frames by electing to not to explicitly compensate the overused bits by an anchor frame. This would mean that video encoder 20 would allow the rate control to adapt to the new lowered bit budget due to higher anchor frame bits. In this example, the over used bits by an anchor frame may be compensated across all the future frames uniformly. Video encoder 20 may determine the QP value to be equal to $\rho^{-1}(R')$.

Video encoder 20 may be configured to encode the non-anchor frame with the determined QP and determine the actual number of bits used $R'_{actual}$. If $R_{overuse} > 0$, $R_{overuse}$ is updated using the equation $R_{overuse} = R_{overuse} + R'_{actual} - R$. Video encoder 20 may be configured to then go to the next frame.

According to the present techniques, the anchor frame and non-anchor frame can either use the same rate distortion model or they can use separate rate distortion models. For example, video encoder 20 may use the rate distortion model for anchor frames $$R = \rho_{anchor}(QP) \quad (25)$$

and use a separate model for non-anchor frame $$R = \rho_{non\text{-}anchor}(QP) \quad (26)$$

In other examples, video encoder 20 may use the same rate distortion model for anchor and non-anchor frames, that is, $\rho_{anchor} = \rho_{non\text{-}anchor}$. When different models are used, the coding efficiency may be improved. However, some examples due to the extra implementation complexity use the same rate distortion model for anchor and non-anchor frames.

The techniques in the present disclosure are tested and is applied to JCTVC sequences and IP camera sequences when VBR rate control scheme is used in the venus343 HEVC encoder. Table 1 shows the performance gain when the present techniques are applied to JCTVC sequences. Here the intra period is 1 second. If intra period is −1 (only the first frame is an I frame), the gain will be even more. For sequences with static scenes such as IP camera sequences, the gain is more. Table 2 shows the gain when the method is applied to IP camera sequences. Table 3 shows the performance gain when the method is applied to venus343 AVC encoder for JCTVC sequences. Table 4 shows the performance gain when the method is applied to venus343 AVC encoder for NEST IP camera sequences. Therefore, the disclosed techniques can achieve significant BD-rate gain.

TABLE 1

Performance Improvement of Venus343 HEVC encoder for JCTVC sequences when Intra Period is 1 second

| Sequence Category | Y | U | V | Combined YUV(6 * Y + U + V)/8 |
|---|---|---|---|---|
| CC_UHD | 0.5% | −0.8% | −0.9% | 0.17% |
| CC_1080p | 0.2% | −6.9% | −7.6% | −1.66% |
| CC_720p | 0.1% | −13.1% | −15.7% | −3.56% |
| CC_WVGA | −2.8% | −7.5% | −6.9% | −3.89% |
| CC_WQVGA | −1.5% | −8.3% | −6.9% | −3.04% |
| VT_720p | −4.8% | −16.8% | −16.6% | −7.81% |
| VT_1080p | −3.1% | −2.0% | −9.4% | −3.73% |
| WFD_Comp | −4.8% | −10.7% | −9.5% | −6.14% |
| WFD_Grap | −1.2% | −4.4% | −4.5% | −2.03% |
| WFD_SC | −4.9% | −3.0% | −2.9% | −4.42% |
| SV_UHD | −8.1% | −18.1% | −20.1% | −10.88% |
| Overall All | −1.6% | −7.9% | −8.8% | −3.28% |

TABLE 2

Performance Improvement of Venus343 HEVC encoder for NEST IP camera sequences when Intra Period is 4 seconds

| Sequence Category | Y | U | V | Combined YUV(6 * Y + U + V)/8 |
|---|---|---|---|---|
| CC_1080p | −15.3% | −19.7% | −24.7% | −17.01% |
| CC_720p | −14.9% | −24.1% | −21.6% | −16.87% |
| Overall All | −15.1% | −21.9% | −23.2% | −16.94% |

The disclosed techniques are applied to JCTVC sequences when CBR rate control scheme is used in AR50 encoder with an intra period of 1 second. Table 5 and table 6 shows the performance gain of the proposed method for HEVC encoder and AVC encoder. Again, the proposed techniques can achieve significant BD-rate gain and still meet the requirements of VBR or CBR rate control with the BD-rate gain.

TABLE 3

Performance Improvement of Venus343 AVC encoder for JCTVC sequences when Intra Period is 1 second

| Sequence Category | Y | U | V | Combined YUV(6 * Y + U + V)/8 |
|---|---|---|---|---|
| CC_1080p | 0.9% | −5.9% | −8.0% | −1.06% |
| CC_720p | 0.5% | −8.3% | −11.8% | −2.17% |
| CC_WVGA | −0.3% | −8.0% | −8.1% | −2.21% |
| CC_WQVGA | 0.0% | −5.9% | −5.7% | −1.49% |
| VT_720p | −4.9% | −16.0% | −17.5% | −7.89% |
| VT_1080p | −4.3% | −8.7% | −15.7% | −6.30% |
| WFD_Comp | −6.1% | −15.3% | −14.8% | −8.35% |
| WFD_Grap | −3.8% | −9.1% | −9.9% | −5.24% |
| WFD_SC | −5.4% | −7.9% | −8.0% | −6.05% |
| Overall All | −1.3% | −8.6% | −10.6% | −3.40% |

TABLE 4

Performance Improvement of Venus343 AVC encoder for NEST IP camera sequences when Intra Period is 4 seconds

| Sequence Category | Y | U | V | Combined YUV(6 * Y + U + V)/8 |
|---|---|---|---|---|
| CC_1080p | −16.6% | −19.5% | −24.7% | −17.98% |
| CC_720p | −15.6% | −19.3% | −22.2% | −16.88% |
| Overall All | −16.1% | −19.4% | −23.5% | −17.43% |

TABLE 5

Performance Improvement of AR50 HEVC encoder for JCTVC sequences when Intra Period is 1 second

| Sequence Category | Y | U | V | Combined YUV(6 * Y + U + V)/8 |
|---|---|---|---|---|
| CC_1080p | −1.6% | −3.6% | −3.2% | −2.07% |
| CC_720p | −2.5% | −3.4% | −5.0% | −2.93% |
| CC_WVGA | −0.7% | −2.9% | −2.9% | −1.25% |
| CC_VGA | −0.1% | 0.2% | 0.1% | −0.06% |
| CC_CIF | 0.0% | −1.1% | −0.9% | −0.23% |
| CC_WQVGA | −0.8% | −2.1% | −1.6% | −1.04% |
| VT_720p | −5.6% | −8.0% | −8.0% | −6.17% |
| VT_1080p | −5.7% | −7.7% | −7.4% | −6.15% |
| Overall All | −2.5% | −4.2% | −4.1% | −2.90% |

TABLE 6

Performance Improvement of AR50 AVC encoder for JCTVC sequences when Intra Period is 1 second

| Sequence Category | Y | U | V | Combined YUV(6 * Y + U + V)/8 |
|---|---|---|---|---|
| CC_1080p | −1.2% | −2.1% | −2.4% | −1.44% |
| CC_720p | −2.3% | −2.7% | −2.6% | −2.35% |
| CC_WVGA | −0.6% | −1.7% | −1.7% | −0.89% |
| CC_VGA | 0.0% | 0.0% | 0.0% | 0.01% |
| CC_CIF | −1.5% | −1.7% | −1.8% | −1.60% |
| CC_WQVGA | −0.5% | −1.0% | −0.8% | −0.60% |
| VT_720p | −5.0% | −5.6% | −5.7% | −5.15% |
| VT_1080p | −5.8% | −5.4% | −5.8% | −5.76% |
| Overall All | −2.5% | −2.9% | −3.0% | −2.58% |

Figure 9:
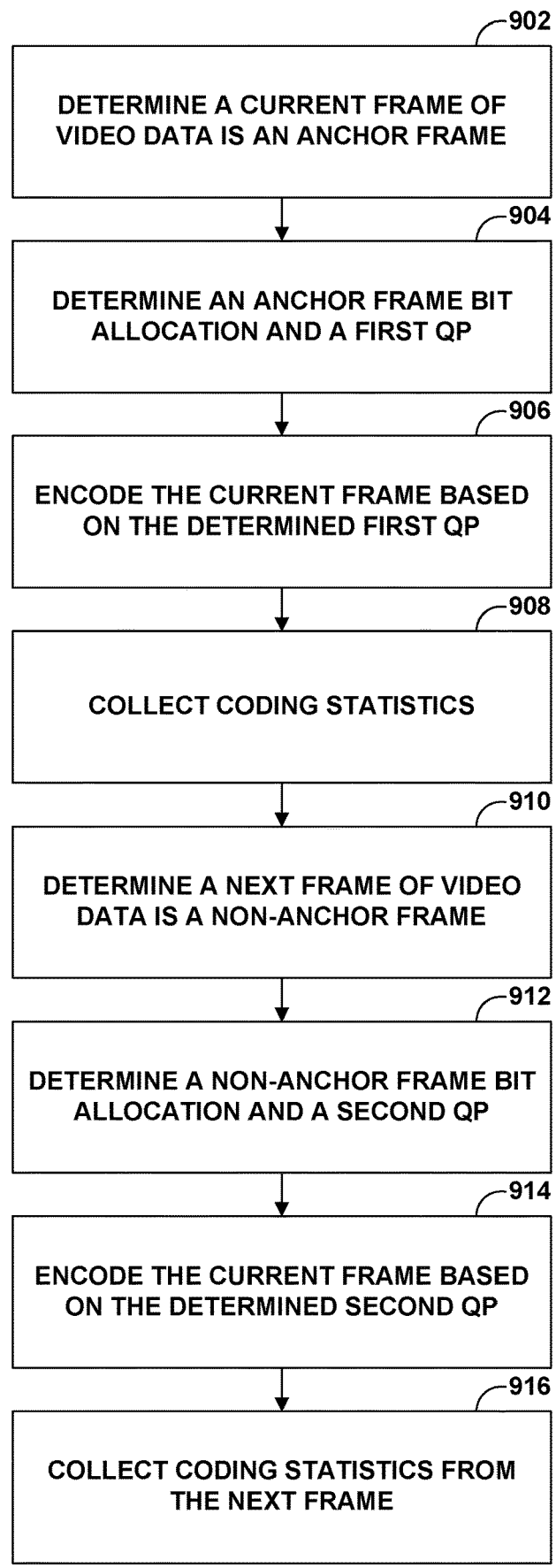
FIG. 9 is a flowchart illustrating an example method according to aspects of the present disclosure.

FIG. 9 is a flowchart illustrating an example method according to aspects of the present disclosure. Video encoder 20 may be configured to determine a current frame of video data is an anchor frame (902).

Video encoder 20 may determine the current frame is an anchor frame based on one or more of a number of frames since a last anchor frame, an average motion amplitude since the last anchor frame, a number of intra coded blocks in a last frame, whether a first threshold amount of motion is determined between a last two frames, or motion information in previous frames. For example, motion information may include whether a second threshold amount of motion is determined based on an average motion vector amplitude of a plurality of frames since a last anchor frame. Video encoder 20 may determine the current frame is the anchor frame is based on: comparing a number of frames since a last anchor frame to a minimum GOP size, comparing the number of frames since the last anchor frame to a maximum GOP size, comparing an average motion amplitude since the last anchor frame with a first threshold, comparing a percentage of intra-coded blocks in the last frame with a second threshold, or comparing motion vector information between a last two frames to determine an amount of change, or comparing an average motion vector amplitude of a plurality of frames since a last anchor frame with a second threshold to determine an amount of motion.

When the current frame is determined to be the anchor frame, video encoder 20 may determine an anchor frame's bit allocation and a first QP using coding statistics from a previous frame (904). The anchor frame bit allocation may increase the bit allocation of the current frame compared to a previous non-anchor frame. The amount of the increase in the anchor frame bit allocation may be based on the distance between the current frame and a previous anchor frame. In another example, video encoder 20 may increase the bit allocation based on a bit ratio look up table based on the distance between the current frame and the previous anchor frame and a maximum distance between anchor frames.

To perform the QP determination, video encoder 20 may be configured to calculate an average motion vector amplitude of frames since a last anchor frame, determine whether the average motion vector amplitude of frames since the last anchor frame is less than a first threshold, determine whether the average motion vector amplitude of frames since the last anchor frame is less than a second threshold which is larger than the first threshold, and determine the first QP based on the determining whether the average motion vector amplitude of frames since the last anchor frame is less than the first threshold and the determining whether the average motion vector amplitude of frames since the last anchor frame is less than the second threshold. In other examples, video encoder 20 may increase a bit allocation for encoding the anchor frame, and estimate the first QP based on the increased bit allocation. Video encoder 20 may be configured to clip the anchor frame bit allocation based on a rate control algorithm.

Video encoder 20 may be configured to encode the current frame based on the determined first QP (906). Video encoder 20 may be configured to collect coding statistics from the current frame (908). Video encoder 20 may be configured to determine a next frame of video data is a non-anchor frame (910). When the video encoder determines the video frame is a non-anchor frame. Following encoding, video encoder 20 may be configured to calculate an actual number of bits used to encode the current frame using the determined first QP, calculate an overused number of bits based on the actual number of bits used to encode the current frame, and allocate bits for the non-anchor frame based on the overused number of bits.

Video encoder 20 may be configured to determine a non-anchor frame bit allocation and a second QP using coding statistics from the current frame when the next frame is determined to be the non-anchor frame (912). In one example, video encoder 20 may allocate bits for the non-anchor frame based on the overused number of bits comprises allocating bits by uniformly compensating bits across future non-anchor frames. In other examples, video encoder 20 may estimate, using a rate control algorithm, a number of bits to allocate the next frame following the current frame and allocate half of the estimated number of bits for the next frame.

Video encoder 20 may be configured to encode the current frame based on the determined second QP (914). Video encoder 20 may be configured to collect coding statistics from the next frame (916). Video encoder 20 may be configured to recalculate the overused number of bits following encoding of the next frame based on the overused number of bits and an actual number of bits used to encode the next frame.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a current frame of video data is an anchor frame based on an average motion amplitude since a last anchor frame;
   when the current frame is determined to be the anchor frame, determining an anchor frame bit allocation and a first quantization parameter (QP) using coding statistics from a previous frame, wherein determining the first QP comprises:
      calculating an average motion vector amplitude of frames since the last anchor frame,
      determining whether the average motion vector amplitude of frames since the last anchor frame is less than a first threshold,
      determining whether the average motion vector amplitude of frames since the last anchor frame is less than a second threshold in the case that the average motion vector amplitude of frames since the last anchor frame is greater than the first threshold, the second threshold being larger than the first threshold, and
      determining the first QP based on the determination of whether the average motion vector amplitude of frames since the last anchor frame is less than the first threshold and the determination of whether the average motion vector amplitude of frames since the last anchor frame is less than the second threshold;
   encoding the current frame based on the determined first QP;
   collecting coding statistics from the current frame;
   determining a next frame of video data is a non-anchor frame;
   when the next frame is determined to be the non-anchor frame, determining a non-anchor frame bit allocation and a second QP using coding statistics from the current frame;
   encoding the next frame based on the determined second QP; and
   collecting coding statistics from the next frame.

2. The method of claim 1, wherein determining the current frame is the anchor frame is further based on at least one of: a number of frames since the last anchor frame, a number of intra coded blocks in a last frame, or motion information in previous frames.

3. The method of claim 1, wherein determining the current frame is the anchor frame is further based on at least one of:
   comparing a number of frames since the last anchor frame to a minimum group of pictures (GOP) size;
   comparing the number of frames since the last anchor frame to a maximum GOP size;
   comparing the average motion amplitude since the last anchor frame with a first threshold;
   comparing a percentage of intra-coded blocks in the last frame with a second threshold; or
   comparing motion vector information between a last two frames to determine an amount of change.

4. The method of claim 1, further comprising:
   calculating an actual number of bits used to encode the current frame using the determined first QP;
   calculating an overused number of bits based on the actual number of bits used to encode the current frame; and
   allocating bits for the non-anchor frame based on the overused number of bits.

5. The method of claim 4, wherein allocating bits for the non-anchor frame based on the overused number of bits comprises allocating bits by uniformly compensating bits across future non-anchor frames.

6. The method of claim 4, wherein allocating bits for the non-anchor frame based on the overused number of bits comprises:
   estimating, using a rate control algorithm, a number of bits to allocate the next frame following the current frame; and
   allocating half of the estimated number of bits for the next frame.

7. The method of claim 4, further comprising:
   recalculating the overused number of bits following encoding of the next frame based on the overused number of bits and an actual number of bits used to encode the next frame.

8. The method of claim 4, wherein allocating bits for the next frame based on the overused number of bits comprises:
   estimating, using a rate control algorithm, a number of bits to allocate a non-anchor frame two frames after the current frame;
   in the non-anchor frame two frames after the current frame, allocating the larger of:
   two-thirds of the estimated number of bits to allocate, and
   the estimated number of bits to allocate minus the overused number of bits.

9. The method of claim 1, wherein the anchor frame bit allocation increases the bit allocation of the current frame compared to a previous non-anchor frame.

10. The method of claim 9, wherein an amount of the increase in the anchor frame bit allocation is based on the distance between the current frame and a previous anchor frame.

11. The method of claim 10, further comprising clipping the anchor frame bit allocation based on a rate control algorithm.

12. The method of claim 10, wherein the increase in the anchor frame bit allocation is based on a bit ratio look up table based on the distance between the current frame and the previous anchor frame and a maximum distance between anchor frames.

13. A video encoding device comprising:
   a video data memory configured to store a current frame of video data; and
   processing circuitry in communication with the video data memory, the processing circuitry being configured to:
      determine a current frame of video data is an anchor frame based on an average motion amplitude since a last anchor frame;
      when the current frame is determined to be the anchor frame, determine an anchor frame bit allocation and a first quantization parameter (QP) using coding statistics from a previous frame, wherein to determine the first QP, the processing circuitry is configured to:
         calculate an average motion vector amplitude of frames since the last anchor frame,
         determine whether the average motion vector amplitude of frames since the last anchor frame is less than a first threshold, determine whether the average motion vector amplitude of frames since the last anchor frame is less than a second threshold in the case that the average motion vector amplitude of frames since the last anchor frame is greater than the first threshold, the second threshold being larger than the first threshold; and determine the first QP based on the determination of whether the average motion vector amplitude of frames since the last anchor frame is less than the first threshold and the determination of whether the average motion vector amplitude of frames since the last anchor frame is less than the second threshold;

encode the current frame based on the determined first QP;

collect coding statistics from the current frame;

determine a next frame of video data is a non-anchor frame;

when the next frame is determined to be the non-anchor frame, determine a non-anchor frame bit allocation and a second QP using coding statistics from the current frame;

encode the next frame based on the determined second QP; and collect coding statistics from the next frame.

14. The video encoding device of claim 13, wherein the processing circuitry is further configured to determine the current frame is the anchor frame based on at least one of: a number of frames since the last anchor frame, a number of intra coded blocks in a last frame, or motion information in previous frames.

15. The video encoding device of claim 13, wherein the processing circuitry is configured to determine the current frame is the anchor frame is based on at least one of:
comparing a number of frames since the last anchor frame to a minimum group of pictures (GOP) size;
comparing the number of frames since the last anchor frame to a maximum GOP size;
comparing an average motion amplitude since the last anchor frame with a first threshold;
comparing a percentage of intra-coded blocks in the last frame with a second threshold; or
comparing motion vector information between a last two frames to determine an amount of change.

16. The video encoding device of claim 13, wherein the processing circuitry is further configured to:
calculate an actual number of bits used to encode the current frame using the determined first QP;
calculate an overused number of bits based on the actual number of bits used to encode the current frame; and
allocate bits for the non-anchor frame based on the overused number of bits.

17. The video encoding device of claim 16, wherein the processing circuitry is further configured to allocate bits for the non-anchor frame based on the overused number of bits by allocating bits by uniformly compensating bits across future non-anchor frames.

18. The video encoding device of claim 16, wherein the processing circuitry is further configured to allocate bits for the non-anchor frame based on the overused number of bits by:
estimating, using a rate control algorithm, a number of bits to allocate the next frame following the current frame; and
allocating half of the estimated number of bits for the next frame.

19. The video encoding device of claim 16, wherein the processing circuitry is further configured to:
recalculate the overused number of bits following encoding of the next frame based on the overused number of bits and an actual number of bits used to encode the next frame.

20. The video encoding device of claim 16, wherein the processing circuitry is further configured to allocate bits for the next frame based on the overused number of bits by:
estimating, using a rate control algorithm, a number of bits to allocate a non-anchor frame two frames after the current frame;
in the non-anchor frame two frames after the current frame, allocating the larger of:
two-thirds of the estimated number of bits to allocate, and
the estimated number of bits to allocate minus the overused number of bits.

21. The video encoding device of claim 13, wherein the anchor frame bit allocation increases the bit allocation of the current frame compared to a previous non-anchor frame.

22. The video encoding device of claim 21, wherein an amount of the increase in the anchor frame bit allocation is based on the distance between the current frame and a previous anchor frame.

23. The video encoding device of claim 22, wherein the processing circuitry is further configured to clip the anchor frame bit allocation based on a rate control algorithm.

24. The video encoding device of claim 22, wherein the increase in the anchor frame bit allocation is based on a bit ratio look up table based on the distance between the current frame and the previous anchor frame and a maximum distance between anchor frames.

25. An apparatus for of encoding video data, the apparatus comprising:
means for determining a current frame of video data is an anchor frame based on an average motion amplitude since a last anchor frame;
means for determining, when the current frame is determined to be the anchor frame, an anchor frame bit allocation and a first quantization parameter (QP) using coding statistics from a previous frame, wherein the means for determining the first QP comprises:
means for calculating an average motion vector amplitude of frames since the last anchor frame,
means for determining whether the average motion vector amplitude of frames since the last anchor frame is less than a first threshold,
means for determining whether the average motion vector amplitude of frames since the last anchor frame is less than a second threshold in the case that the average motion vector amplitude of frames since the last anchor frame is greater than the first threshold, the second threshold being larger than the first threshold, and
means for determining the first QP based on the determination of whether the average motion vector amplitude of frames since the last anchor frame is less than the first threshold and the determination of whether the average motion vector amplitude of frames since the last anchor frame is less than the second threshold;
means for encoding the current frame based on the determined first QP;
means for collecting coding statistics from the current frame;
means for determining a next frame of video data is a non-anchor frame;

means for determining, when the next frame is determined to be the non-anchor frame, a non-anchor frame bit allocation and a second QP using coding statistics from the current frame;

means for encoding the next frame based on the determined second QP; and means for collecting coding statistics from the next frame.

26. A non-transitory computer-readable storage medium encoded with instructions that, when executed, cause one or more processors of a video encoding device to:

determine a current frame of video data is an anchor frame based on an average motion amplitude since a last anchor frame;

when the current frame is determined to be the anchor frame, determine an anchor frame bit allocation and a first quantization parameter (QP) using coding statistics from a previous frame, wherein to determine the first QP, the instructions further cause the one or more processors to:

calculate an average motion vector amplitude of frames since the last anchor frame, determine whether the average motion vector amplitude of frames since the last anchor frame is less than a first threshold, determine whether the average motion vector amplitude of frames since the last anchor frame is less than a second threshold in the case that the average motion vector amplitude of frames since the last anchor frame is greater than the first threshold, the second threshold being larger than the first threshold; and determine the first QP based on the determination of whether the average motion vector amplitude of frames since the last anchor frame is less than the first threshold and the determination of whether the average motion vector amplitude of frames since the last anchor frame is less than the second threshold;

encode the current frame based on the determined first QP;

collect coding statistics from the current frame;

determine a next frame of video data is a non-anchor frame;

when the next frame is determined to be the non-anchor frame, determine a non-anchor frame bit allocation and a second QP using coding statistics from the current frame;

encode the next frame based on the determined second QP; and collect coding statistics from the next frame.

* * * * *